(12) United States Patent
Ahmed et al.

(10) Patent No.: US 7,395,493 B2
(45) Date of Patent: Jul. 1, 2008

(54) SYSTEMS AND METHODS FOR ADAPTIVELY DECODING TRANSMITTED FRAMES

(75) Inventors: Walid Ahmed, Eatontown, NJ (US); Juan G. Gonzalez, Wilmington, DE (US); Salim Manji, South Plainfield, NJ (US); Jose Luis Paredes, Merida (VE)

(73) Assignee: Lucent Technologies Inc., Murray Hill, NJ (US)

( * ) Notice: Subject to any disclaimer, the term of this patent is extended or adjusted under 35 U.S.C. 154(b) by 469 days.

(21) Appl. No.: 10/161,812

(22) Filed: Jun. 4, 2002

(65) Prior Publication Data

US 2003/0223512 A1 Dec. 4, 2003

(51) Int. Cl.
*H03M 13/03* (2006.01)

(52) U.S. Cl. ...................................... 714/795
(58) Field of Classification Search .............. 714/774, 714/786, 794, 795, 375, 232, 262, 341
See application file for complete search history.

(56) References Cited

U.S. PATENT DOCUMENTS 5,745,524 A * 4/1998 Hull ........................... 375/244
5,867,531 A * 2/1999 Shiino et al. ................ 375/262
6,504,868 B1 * 1/2003 Koizumi ...................... 375/232
6,748,032 B1 * 6/2004 Kim et al. .................... 375/340

OTHER PUBLICATIONS

Xue et al., PSP-based decoding for space time trellis code, 2000, IEEE, p. 783-786.*
Prasad et al., Optiomal data receivers for low SNR data signals in non-Gaussian noise and intersymbol interference: receiver structures and their performance analysis, Oct. 1988, IEE Proceedings, vol. 135, Pt. F, No. 5, p. 471-480.*
Chugg, Keith M, THe condition of the applicability of the Viterbi Algorithm with Implications for fading channel MLSD, Sep. 1998, IEEE Trans. on Comm. vol. 46, No. p, pp. 1112-1116.*
Arce et al., Maximum likelihood decoding of convolutional codes for non-Gaussian channels, 1999, Google (retrieved Feb. 24, 2008), p. 1 to 17.*
Chen et al., Adaptive joint detection and decoding in fialt-fading channels via mixture Kalman filtering, Sep. 2000, IEEE Trans. on info. Theory, vol. 46, No. 6, p. 2079-2094.*

* cited by examiner

*Primary Examiner*—Shelly A Chase

(57) ABSTRACT

The present invention provides systems and methods for adaptively decoding transmitted frames efficiently in non-Gaussian, non-stationary environments. One such system comprises a decoder adapted to decode a received transmission frame using a decoding scheme, a channel assessment unit for sensing channel characteristics, and a tuning unit for adjusting the decoding scheme based, at least in part, on channel characteristics sensed by the channel assessment unit.

31 Claims, 4 Drawing Sheets

SYSTEMS AND METHODS FOR ADAPTIVELY DECODING TRANSMITTED FRAMES

TECHNICAL FIELD

The present invention relates to the field of communications, and more particularly, systems and methods for adaptively decoding transmitted frames in the presence of impulsive noise and interference.

BACKGROUND OF THE INVENTION

As the world has become more reliant on computers and information exchange, the need for the reliable transmission of data has become increasingly important. One key element in information exchange is the accurate and efficient transmission and reception of data across noisy transmission channels.

Signal processing methods implemented in practical communications systems are usually designed under the assumption that any underlying noise and interference is Gaussian. Although this assumption finds strong theoretical justification in the central limit theorem, the noise and interference patterns commonly present in modem mobile communications systems are far from Gaussian. Noise and interference generally exhibit "impulsive" behavior. In typical mobile communication systems, noise and interference sources often include motor-vehicle ignition noise, switching noise from electromechanical equipment, thunderstorms, and heavy bursts of interference. Current signal processing systems are not designed to handle these non-Gaussian noise sources. Accordingly, these systems may perform poorly, and might even fail, in the presence of impulsive noise.

Channel noise and interference can be effectively modeled as the superposition of many small and independent effects. In practice, these effects do not always follow a Gaussian distribution. This situation appears to contradict the central limit theorem. For many years, engineers have been unable to explain this apparent contradiction. Consequently, many of the techniques developed to cope with impulsive noise were mainly ad hoc, largely based on signal clipping and filtering prior to application of a Gaussian-based technique.

Clipping the amplitude of an input signal is only effective if the amplitude of the input signal is above or below the specific threshold values. These threshold values are typically determined by the limits of the hardware used in a receiver in a communications system. Accordingly, the threshold values are often chosen to take advantage of the full dynamic range of the analog to digital (A/D) converter(s) of the receiver. However, if impulsive noise, added to the input signal, does not cause the amplitude of the signal to exceed a specific threshold, clipping will not remove the noise. Additionally, even when noise does cause the signal to exceed the threshold, the clipping solution only removes the noise to the extent that the magnitude of the signal plus the noise is above the threshold. Accordingly, noise is not actually removed, but its effects are somewhat reduced.

When individual signals within a sequence are contaminated by noise, the sequence may not be properly decoded and efficient communications may be difficult. In typical communication systems, decoding is used to identify potential communication errors. Additionally, decoding may be able to correct some, or even most, errors. Errors may be corrected by one of many error detection and correct schemes known to those skilled in the art. Typical coding and decoding schemes are able to correct errors by inserting controlled redundancy into the transmitted information stream. This is typically performed by adding additional bits or using an expanded channel signal set. These schemes allow the receiver to detect and possibly correct errors.

In its most simple form, one problem with noisy transmission environments is that, a certain percentage of the time, a transmitted '1' is received as a '0' or vice versa. There are many methods of encoding data that allow received errors to be detected or even corrected. These encoding and decoding schemes are typically optimized based on a set of underlying assumptions. Preferably, these assumptions are designed to match the conditions of a real-world communications environment. Generally, decoding systems are designed under the assumption that the underlying noise and interference is Gaussian. When these assumptions do not match real-world conditions, the performance of such schemes may no longer be optimal. In real-world environments, this effect is ever-present because conditions are constantly changing. Even those systems in existence that try to accommodate impulsive noise are based on average conditions. These systems fall short of optimal performance when conditions stray from the average. These problems are compounded in a mobile system because conditions change even more rapidly and more often than stationary systems.

When a receiver is able to detect, but not correct, errors in received information, the receiver may request that the transmitter resend the information. In a noisy environment, this may lead to highly inefficient communications.

There is a need in the art for systems and methods for processing signals to alleviate impulsive noise distortion.

Additionally, there is a need in the art for systems and methods for providing an adaptive decoding system for efficient communications in non-Gaussian, non-stationary environments.

SUMMARY OF THE INVENTION

The present invention overcomes the limitations of the existing technology by providing systems and methods for providing adaptive decoding for efficient communications in non-Guassian, non-stationary environments. An exemplary adaptive decoding system in accordance with the present invention comprises a decoder having a decoding scheme for decoding a received transmission frame, a channel assessment unit for sensing channel characteristics, and a tuning unit for adjusting the decoding scheme of the decoder at least in part on the channel characteristics sensed by the channel assessment unit.

Other objects, features, and advantages of the present invention will become apparent upon reading the following detailed description of the embodiments of the invention, when taken in conjunction with the accompanying drawings and appended claims.

DETAILED DESCRIPTION OF THE INVENTION

Figure 1:
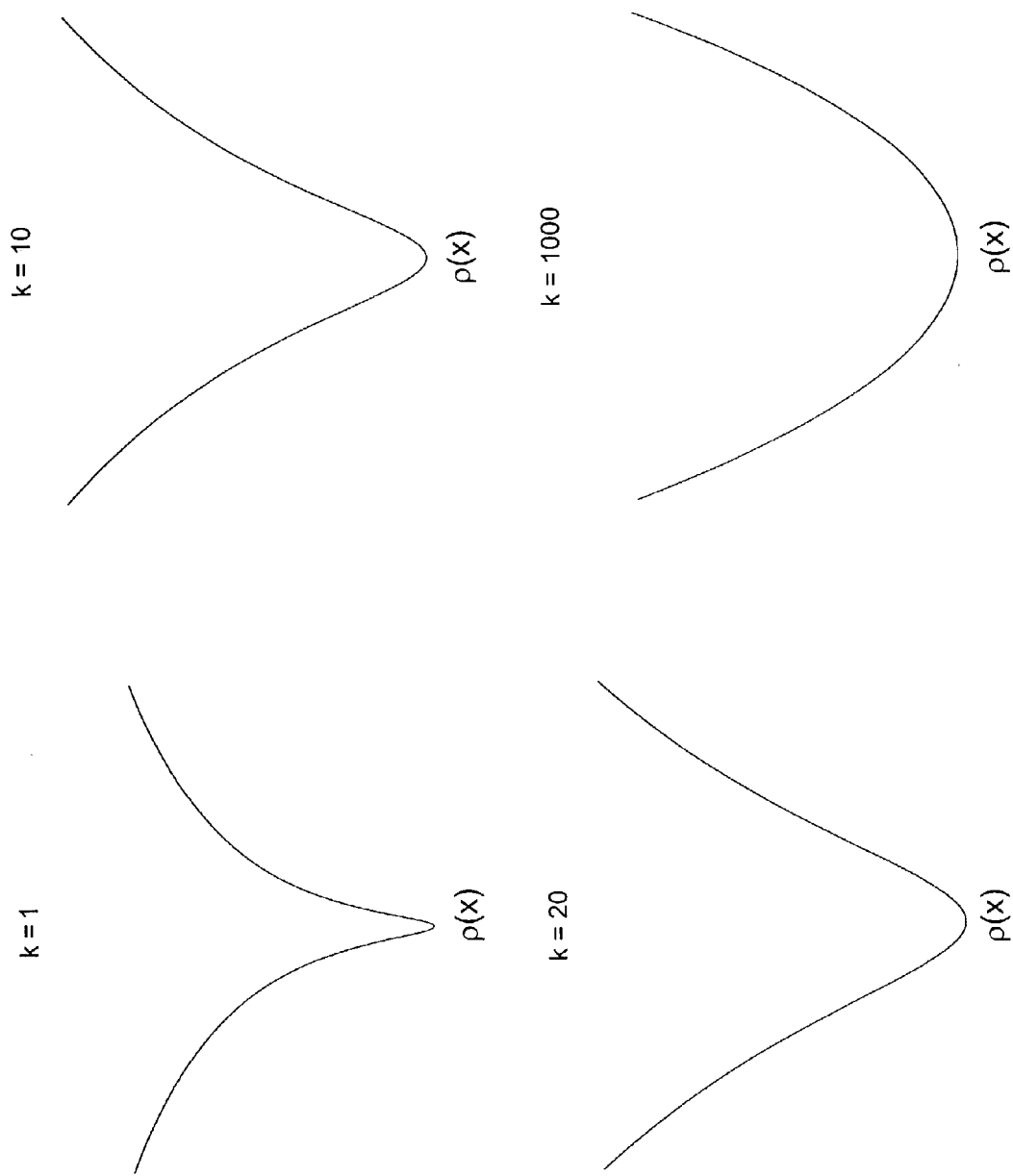
FIG. 1 is an illustration of several plots of a metric $\rho(x)$ for several values of k, which may be used in an exemplary embodiment of the present invention.

Referring now to the drawings, in which like numerals refer to like techniques throughout the several views, exemplary embodiments of the present invention are described.

As discussed in the background of the present invention, noise and interference patterns are comprised of small and independent effects. Placing upper and lower boundaries on the variance of these effects may allow greater reliance on the central limit theorem. From a conceptual perspective, an unbounded or infinite variance is feasible as a model of highly dispersed or impulsive phenomena. Without the finite variance constraint, a converging sum of normalized random variables can be proven to belong to a wider class of random variables known as "α-stable". Thus, similar to Gaussian processes, α-stable processes can appear in practice as the result of physical principles. Furthermore, all non-Gaussian α-stable processes are "heavy-tailed" processes with infinite variance, explaining the often found impulsive nature of practical signals.

"Symmetric" α-stable random variables are commonly described through their characteristic function:

$$\Phi(\omega) = e^{-\gamma|\omega|^\alpha}, \tag{1}$$

where α is the index or characteristic exponent, and γ is the dispersion. Analogous to the variance in a Gaussian process, γ is a measure of signal strength. The shape of the distribution is determined by α From the equation above, it can be shown that α is restricted to values in the interval (0,2]. Qualitatively, smaller values of α correspond to more impulsiveness in the distribution. The limiting case α=2 corresponds to a Gaussian distribution, which is the least impulsive α-stable distribution and the only one with finite variance. A value of α=1 results in a random variable with a Cauchy distribution.

A theory of estimation in α-stable environments can be derived from the tools of robust statistics. In general, let ρ(x) be a symmetric cost function or metric which is monotonically non-decreasing on [0, ∞). For a set of samples $x_1, x_2, \ldots, x_N$, the M-estimator of the location parameter, β, is defined as $$\hat{\beta} = \underset{\beta}{\operatorname{argmin}} \sum_{i=1}^{N} \rho(x_i - \beta). \tag{2}$$

In the theory of M-estimators, the shape of the cost function ρ determines the characteristics of the estimate, $\hat{\beta}$. For example, if $\rho(x)=x^2$, $\hat{\beta}$ becomes the least-squares estimate (i.e. the sample mean). For ρ(x)=|x|, $\hat{\beta}$ is the sample median. The cost function:

$$\rho(x) = \log(k^2 + x^2), \tag{3}$$

where k is a constant, possesses important optimality properties along the whole range of α-stable distributions.

The importance of the cost function described in the above equation is that the value of k can be tuned to give optimal estimation performance depending on the parameters of the underlying distribution. Cost-functions may be tuned to optimize performance for a set of conditions. FIG. 1 shows ρ(x) for different values of the tuned parameter k. Note that as k takes on a very large value, the shape of the cost function is similar to that used by the least squares estimator. On the other hand, for small values of k, ρ(x) grows slowly for large values of x, which is desirable since it adds robustness to the metric function. Given that parameters α and γ of an α-stable distribution generate an independently and identically distributed (i.i.d.) sample, the optimal value of k is given by a function of the form:

$$k(\alpha, \gamma) = k(\alpha)\gamma^{1/\alpha}. \tag{4}$$

The above expression indicates a "separability" property of the optimal value of k in terms of the parameters α and γ. This reduces the problem of the functional form of k (α,γ) to that of determining the simpler form:

$$k(\alpha) = k(\alpha, 1), \ 0 < \alpha \leq 2. \tag{5}$$

This function describes "the α-k plot" of α-stable distributions. Under the "maximum likelihood" optimality criterion, it can be proven that the α-k plot touches three fundamental points:

1. For α=2 (i.e., the Gaussian distribution), the optimal value of k is k=∞, which, for the location estimation problem, makes $\hat{\beta}$ equal to the sample mean.
2. With α=1 (i.e., the Cauchy distribution), the optimal value is k=1. This is a direct consequence of the definition of the cost function in Equation (3), and the fact that the resulting M-estimator is equivalent to the maximum likelihood estimator for a Cauchy distribution.
3. When α→0 (i.e., the most impulsive distribution), the optimal value of k converges to k=0.

Figure 2:
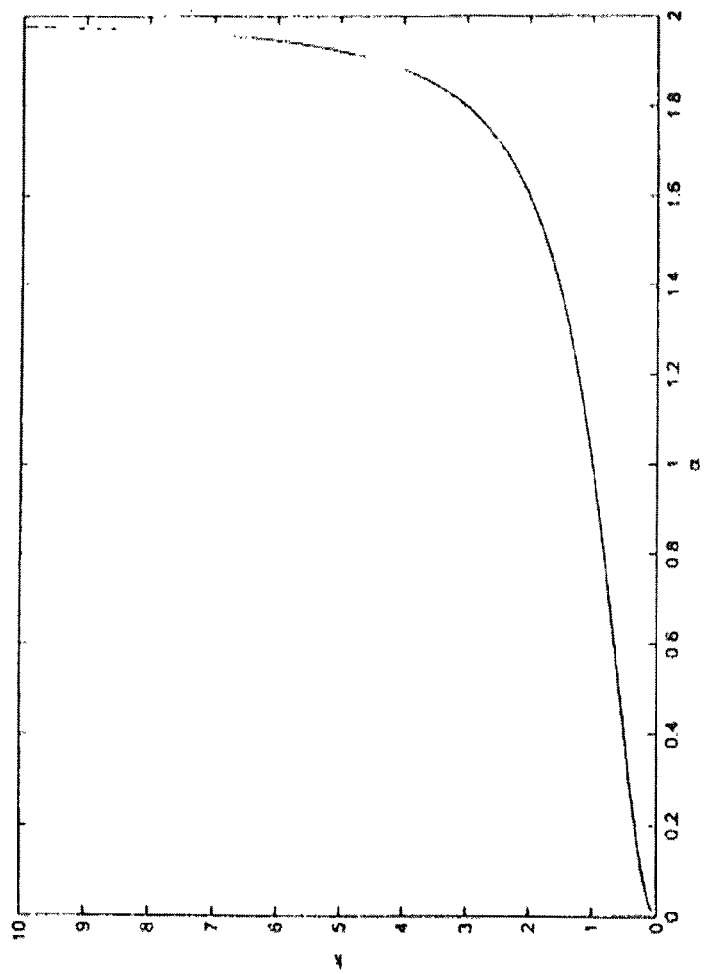
FIG. 2 is a plot of a general $\alpha$-k plot.

The above points suggest the general shape of the α-k plot illustrated in FIG. 2. Although finding an exact expression matching the shape of the α-k plot is difficult, the following approximations may be used:

$$k(\alpha) = \tan\left(\frac{\pi\alpha}{4}\right), \text{ and} \tag{6}$$

$$k(\alpha) = \left(\frac{\alpha}{2-\alpha}\right)^P, \tag{7}$$

where P is in general a positive constant. Due to its relative simplicity and efficient results, the following tuning function is often preferred:

$$k(\alpha) = \sqrt{\frac{\alpha}{2-\alpha}}. \tag{8}$$

One general goal of using encoding and decoding for the transmission of data, is to minimize the probability of error. In the situation where various coded sequences are equally likely, this may be accomplished using a "maximum likelihood" decoder. For hard decision decoding, it is well known that the maximum likelihood decoder selects the codeword that is closest in Hamming distance to the received sequence.

It is also well known that soft decision decoding offers a performance advantage over hard decision decoding. Soft decision decoding preserves information contained in the received sequence and passes that information on to a decoding scheme. The task is to choose a cost function appropriate for soft decision decoding. For a channel with underlying noise and interference that is Gaussian, maximum likelihood decoding is achieved using a Euclidean distance ($\rho(x)=x^2$) as the cost function. Furthermore, if the channel can be accurately modeled as a stationary additive-noise channel with noise density function $f(x)$, an optimal cost function can be easily designated as $\rho(x)=-\log(f(x))$. In real world applications, however, the statistical behavior of a channel is not stationary. Accordingly, finding a model for the channel noise is a significant challenge. This situation is aggravated by the fact that even a very small deviation from model channel assumptions can lead to the design of highly inefficient cost functions. Thus, the choice of an appropriate cost function that gives satisfactory robust performance is important.

The present invention envisions decoders that are adapted to be adjusted according to present channel characteristics. In an exemplary embodiment of the present invention, a Viterbi decoder is used in which a metric function is changed according to channel characteristics. The present invention is optimized for use in channels having any of the following characteristics:

Non-Gaussian/impulsive channels

Time-varying channels

Systems with varying impulsiveness such as cellular systems under varying environment conditions or changing multiuser interference patterns.

Figure 3:
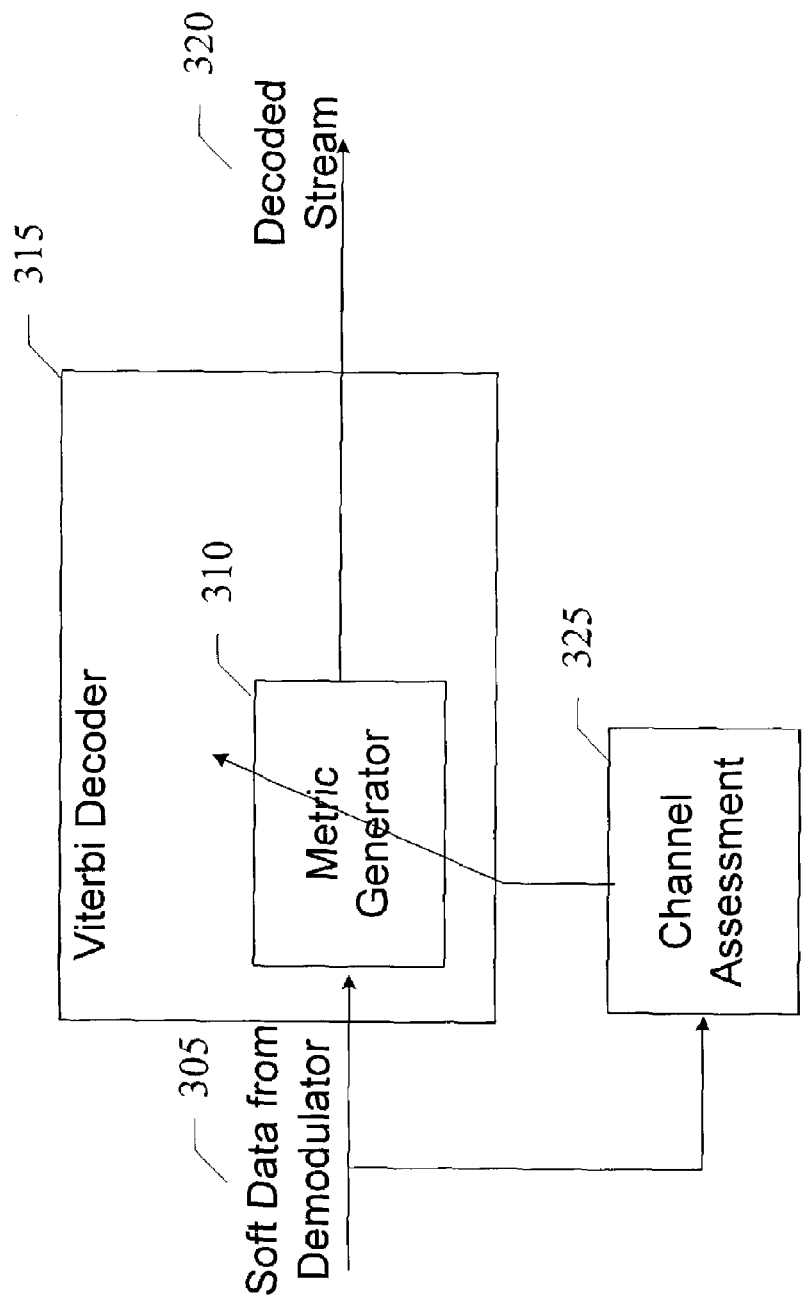
FIG. 3 is a block diagram illustrating an adaptive decoding system in accordance with an exemplary embodiment of the present invention.

FIG. 3 illustrates a block diagram of an adaptive decoder in accordance with an exemplary embodiment of the present invention. The decoder 315 comprises a channel assessment unit 325 adapted to "sense" channel behavior, and to provide instructions to a metric generator 310 of a Viterbi decoder 315. The generator 310 is adjusted based, at least in part, on channel characteristics.

The metric generator 310 is adapted to use a finite number of cost functions $\rho_1, \rho_2, \ldots \rho_N$. The channel assessment unit 325 is, in general, adapted to use a discrete function that, based on soft data encoding from a demodulator (not shown), decides which cost function should be applied. The channel assessment unit 325 may be adapted to make use of a pilot signal or may be further adapted to work directly on the received data sequence. It may also work on a continuous basis, or only during a percentage of the transmission time in the same way as multiplexed pilots.

In an exemplary embodiment of the present invention, the channel assessment may be implemented as the estimator of a vector of channel parameters $\hat{\underline{\theta}}=[\hat{\theta}_1, \hat{\theta}_2, \ldots, \hat{\theta}_p]$. Then, the parameter space $\mathcal{R}$ is partitioned into N disjoint regions, $S_1, S_2, \ldots, S_N$. Selection adaptation is then performed according to the simple rule:

$$\text{select } \rho_i \text{ when } \hat{\underline{\theta}} \in S_i. \tag{9}$$

In an exemplary embodiment of the present invention, the operation of the channel assessment unit 325 may be further explained using the following example of Gaussian/Laplacian selective decoding or "hard" decoding. It should be understood that this is only one example and in no way should be construed as a limitation to the present invention. When performing Gaussian/Laplacian hard adaptation, the following cost functions may be used:

$$\rho_1(x)=x^2 \text{ (Optimum for Gaussian noise)} \tag{10}$$

$$\rho_2(x)=|x| \text{ (Optimum for Laplacian noise).} \tag{11}$$

Alternatively, a channel assessment unit 325 may be adapted to perform a Gaussianity test in place of the channel assessment scheme. The Gaussianity test may have different structures. One commonly used Gaussianity test is based on Bispectral estimation. In this method, the 2-D Fourier Transform of the third order cumulant sequence yields the bispectrum of the process. Essentially the bispectrum of a Gaussian process is zero over all frequencies (zero cumulant matrix).

The Gaussian test hypothesizes whether there is sufficient statistical deviation from zero to imply a non-Guassian source. The main goal of the Gaussianity test is to give information about the current impulsiveness of the channel. Typically, the test will be comprised of a real function $\lambda$, applied to the demodulated history:

$$\lambda=\lambda(\hat{\beta}_M, \hat{\beta}_{M-1}, \hat{\beta}_{M-2}, \ldots \hat{\beta}_1), \tag{12}$$

where $\hat{\beta}_M$ is the current demodulated symbol, and $\hat{\beta}_{M-i}$ is the output of the demodulator i symbols ago. If $\lambda$ is larger than a predetermined constant C, then the test determines that the channel can be considered Gaussian, and $\rho_1$ is chosen. On the contrary, if $\lambda \leq C$, the test indicates a tail heavier than Gaussian, calling for the use of a more impulse-resistant cost function, namely $\rho_2$.

It should be noted that the performance of the system depends strongly on the quality of the test. Also, the adaptation speed and/or responsiveness of the system is determined by the relative importance that the function $\lambda$ gives to recent and old data. In an exemplary embodiment of the present invention, $\lambda$ is a "weighted" test function assigning more importance or weight to the most recent data. The variation of the weight distribution determines the responsiveness of the system. Furthermore, $\lambda$ can be defined to operate only on the M most recent data. The size of M, in this case, will determine the system responsiveness (or adaptivity), with small values of M corresponding to more responsive systems.

When transitions from one cost function to the other occur, the memory of the decoder is adapted to store information in terms of the old cost function. As part of the normal operation of the decoder 315, the metrics associated with the new cost function are added to old accumulated metrics. Hence, metrics may be scaled in order to guarantee comparability or compatibility of $\rho_1$ and $\rho_2$ when both contribute information to the accumulated metric.

Noting that $\rho_2$ and $c\rho_2$ (for c>0) are equivalent cost functions, an optimal value of c may be designed to guarantee compatibility and optimal performance during transitions. Such values of c are referred to as the transition constants of the system. Although only one non-unit transition constant is needed for the example outlined, $c_1$ and $c_2$ may be referred to as the associated transition constants in the sense that the implementation of the decoder 315 uses the equivalent metrics $c_1\rho_1$ and $c_2\rho_2$.

The present invention may also be used for soft adaptation implementations. When operating using soft adaptations, a family of cost functions are defined: $\rho_k, k \in \mathcal{R}$. The tuning of the system (i.e., the selection of the cost function to be used) is performed using a tuning function:

$$\underline{k}=\underline{k}(\hat{\underline{\theta}}). \tag{13}$$

The difference between hard and soft adaptation (and associated hard and soft data) can be seen as

| hard | → | k is a quantized function |
|------|---|---------------------------|
| soft | → | $\overline{k}$ is continuous |

In hard adaptation, a firm (or hard) decision is made regarding each bit as it is received. In soft adaptation, decisions may be changed if other received bits (typically received later in time) indicate that the earlier decision was likely incorrect.

A third function, the transition function, (in addition to the previously introduced cost and tuning functions) is used in soft adaptations. Instead of the constants $c_1, c_2, \ldots c_N$ used in hard adaptation, a function c(k) scales each $\rho_k$ appropriately to allow an efficient comparison among the different cost functions.

The use of different cost functions may be illustrated using a Myriad-based decoder. In an exemplary embodiment of the present invention, a Myriad-based decoder is adapted to use the following cost function and parameters:

$\rho_k(x) = \log(k^2 + x^2)$, $k \in \mathcal{R}$ $\underline{\theta} = [\alpha, \gamma]$ (The parameters characterizing $\alpha$-stable noise)

$\underline{\theta} = [\hat{\alpha}, \hat{\gamma}]$ (Any specific known estimator)

$k(\theta) = k(\hat{\alpha}, \hat{\gamma}) = k(\hat{\alpha}) \gamma^{1/\alpha}$, where $k(\hat{\alpha})$ is a predetermined $\alpha$-k plot such as the one shown in FIG. 3.

The optimal form of c(k) may be designed through simulations or from theoretical analysis. For instance, $c(k) = k^2$ is an exemplary sample which generally provides good performance. Alternatively, simulations may be performed to identify a function c(k) that produces optimal results for a specified system.

Figure 4:
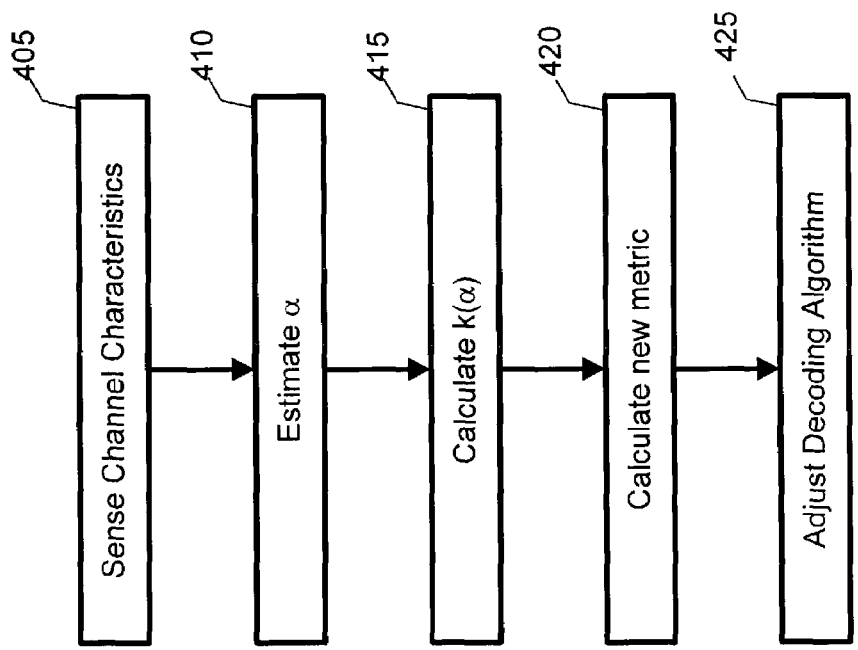
FIG. 4 is a flow diagram illustrating a method of adjusting the metric of a decoding scheme in accordance with an exemplary embodiment of the present invention.

FIG. 4 is a flow diagram of a method for adjusting a decoding scheme in accordance with an exemplary embodiment of the present invention. In step 405 of an exemplary adaptive decoding method, the system first senses the channel characteristics of the current transmission channel using one of many methods known in the art. Among the sensed channel characteristics are noise characteristics. Channel noise has an associated $\alpha$, which is representative of the impulsiveness of channel noise. Assuming that $\alpha$ is stable (generally a valid assumption), $\alpha$ may be estimated using a standard $\alpha$ estimator in step 410.

Once a value of $\alpha$ is estimated, $k(\alpha)$ may be calculated in step 415 using one of the approximation functions for $k(\alpha)$ shown above, or $k(\alpha)$ may be taken directly from the $\alpha$-k plot shown in FIG. 2. After calculating the appropriate value for $k(\alpha)$, the new metric shape may be calculated in step 420 according to the following function:

$\rho_k(x) = \log(k^2 + x^2)$ (14)

After the new metric is calculated, the decoding scheme may be adjusted to the new metric in step 425.

While this invention has been described with reference to embodiments thereof, it should be understood that variations and modifications can be made without departing from the spirit and scope of the present invention as defined by the claims that follow.

We claim:

1. An adaptive decoding system comprising:
   a decoder adapted to decode a received transmission sequence using a decoding scheme;
   a channel assessment unit for sensing channel characteristics, and estimating a value for an indicator of the impulsiveness of the channel; and
   a tuning unit for adjusting the decoding scheme of the decoder based at least in part on the channel characteristics and estimated value.

2. The system of claim 1, wherein the channel assessment unit is further adapted to estimate $\alpha$, an indicator of the impulsiveness of the channel.

3. The system of claim 1, wherein the tuning unit is further adapted to adjust the decoding scheme of the decoder based at least in part on a value k that is calculated from the estimated value of the indicator of the impulsiveness of the channel.

4. The system of claim 3, wherein the tuning unit is adapted to adjust the decoding scheme using k, calculated from an $\alpha$-k plot, wherein $\alpha$ is an indicator of the impulsiveness of the transmission channel.

5. The system of claim 3, wherein the tuning unit is adapted to adjust the decoding scheme using k, calculated in accordance with the following equation:

$$k(\alpha) = \sqrt{\frac{\alpha}{2-\alpha}},$$

where $\alpha$ is an indicator of the impulsiveness of the channel estimated using an estimator of the characteristic exponent of an alpha-stable distribution.

6. The system of claim 1, wherein the decoding scheme comprises a decoding metric calculated in accordance with the following equation:

$\rho_k(x) = \log(k^2 + x^2)$, where k is calculated from $\alpha$, an indicator of the impulsiveness of the channel.

7. The system of claim 1, wherein the decoding scheme uses a first metric, the system further comprising:
   a metric generator adapted to calculate a second metric for use with the decoding scheme, the second metric being selected based on the sensed channel characteristics of the predetermined transmission channel, the metric generator being further adapted to scale the second metric to increase compatibility between the first metric and the second metric, and the metric generator being further adapted to apply the scaled second metric to the decoding scheme.

8. The system of claim 7, wherein the metric generator is further adapted to use a transition constant to scale the second metric.

9. The system of claim 7, wherein the metric generator and the tuning unit are a single unit.

10. A method for adapting a decoding scheme of a decoding system, the method comprising:
    sensing the channel characteristics of a predetermined transmission channel;
    estimating a value for an indicator of the impulsiveness of the channel; and
    shaping the decoding scheme based at least in part on the channel characteristics and estimated value.

11. The method of claim 10, further comprising the step of computing a value k based on the estimated value of the impulsiveness of the predetermined transmission channel.

12. The method of claim 11, wherein the step of computing the value k comprises selecting the value from an $\alpha$-k plot.

13. The method of claim 11, wherein the step of computing the value k is performed in accordance with the following equation:

$$k(\alpha) = \sqrt{\frac{\alpha}{2-\alpha}},$$

where $\alpha$ is an indicator of the impulsiveness of the channel estimated using an estimator of the characteristic exponent of an alpha-stable distribution.

14. The method of claim 11, wherein the step of shaping the decoding scheme is performed using a cost function calculated in accordance with the following equation:

$$\rho_k(x) = \log(k^2 + x^2),$$

where k is calculated from $\alpha$, an indicator of the impulsiveness of the channel.

15. The method of claim 11, wherein the step of computing the value k is performed in accordance with the following equation:

$$k(\alpha) = \tan\left(\frac{\pi\alpha}{4}\right).$$

16. The method of claim 11, wherein the step of computing the value k is performed in accordance with the following equation:

$$k(\alpha) = (\alpha/\alpha - 2)^P,$$ where P is a positive constant.

17. The method of claim 10, wherein the steps are performed repeatedly throughout the reception of a transmitted sequence.

18. The method of claim 10, wherein the decoding scheme has a first metric, and wherein the step of shaping the decoding scheme comprises:
   calculating a second metric for use with the decoding scheme, the second metric being selected based on the sensed channel characteristics of the predetermined transmission channel;
   scaling the second metric to increase compatibility between the first metric and the second metric; and
   applying the scaled second metric to the decoding scheme.

19. The method of claim 18, wherein the step of scaling the second metric comprises using a transition constant to scale the second metric.

20. A method for adapting a decoding scheme of a decoding system, the method comprising:
   sensing the channel characteristics of a predetermined transmission channel;
   determining a transmission channel statistic representative of the statistical properties of the transmission channel; and
   selecting a cost function for a decoding scheme based, at least in part, on the transmission channel statistic.

21. The method of claim 20, wherein the steps of the method are performed repeatedly throughout the reception of a transmitted sequence.

22. The method of claim 20, wherein the step of sensing the transmission channel characteristics comprises sensing the impulsiveness of the transmission channel.

23. The method of claim 22, wherein the step of determining a transmission channel statistic representative of the statistical properties of the transmission channel comprises estimating $\alpha$ value a representative of the impulsiveness of the transmission channel.

24. The method of claim 23, wherein the step of selecting a cost function comprises calculating a cost function from the estimated value $\alpha$.

25. The method of claim 24, wherein the cost function is calculated in accordance with the following equation:

$$\rho^k(x) = \log(k^2 + x^2),$$ where k is calculated from the value of $\alpha$.

26. An adaptive decoding system comprising:
   a decoder adapted to decode a received transmission sequence using a first decoding scheme;
   a channel assessment unit for sensing channel characteristics; and
   a metric generator for selecting a cost function for a second decoding scheme based on the sensed channel characteristics.

27. The system of claim 26, wherein the channel assessment unit and the metric generator are adapted to repeatedly sense channel characteristics and calculate cost functions.

28. The system of claim 26, wherein the channel assessment unit is adapted to sense the impulsiveness of a transmission channel.

29. The system of claim 28, wherein the channel assessment unit is further adapted to estimate $\alpha$, a value representative of the impulsiveness of the transmission channel.

30. The system of claim 29, wherein the metric generator is adapted to calculate a cost function from the estimated value $\alpha$.

31. The system of claim 30, wherein the metric generator is further adapted to calculate a cost function in accordance with the following equation:

$$\rho^k(x) = \log(k^2 + x^2),$$

where k is calculated from $\alpha$.

* * * * *